(12) United States Patent
Hofmann (10) Patent No.: US 11,014,747 B2
(45) Date of Patent: May 25, 2021

(54) DRIVERLESS TRANSPORT DEVICE FOR ASSEMBLING A MOTOR VEHICLE AND METHOD FOR UNLOADING A MOTOR VEHICLE FROM A TRANSPORT VEHICLE OF THIS TYPE

(71) Applicant: Universitaet Stuttgart, Stuttgart (DE)

(72) Inventor: Matthias Hofmann, Gingen (DE)

(73) Assignee: Universitaet Stuttgart, Stuttgart (DE)

( * ) Notice: Subject to any disclaimer, the term of this patent is extended or adjusted under 35 U.S.C. 154(b) by 208 days.

(21) Appl. No.: 15/750,392

(22) PCT Filed: Aug. 5, 2016

(86) PCT No.: PCT/EP2016/068805
§ 371 (c)(1),
(2) Date: Feb. 5, 2018

(87) PCT Pub. No.: WO2017/021547
PCT Pub. Date: Feb. 9, 2017

(65) Prior Publication Data
US 2018/0229933 A1 Aug. 16, 2018

(30) Foreign Application Priority Data
Aug. 6, 2015 (DE) ...................... 10 2015 214 980.3

(51) Int. Cl.
*B62D 65/18* (2006.01)
*B66F 7/22* (2006.01)
*B65G 7/08* (2006.01)

(52) U.S. Cl.
CPC .............. *B65G 7/08* (2013.01); *B62D 65/18* (2013.01); *B66F 7/22* (2013.01); *B65G 2201/0294* (2013.01)

(58) Field of Classification Search
CPC ...... B66F 7/00; B66F 7/10; B66F 7/22; B66F 9/12; B65B 7/08; B65G 7/08;
(Continued)

(56) References Cited

U.S. PATENT DOCUMENTS 2,896,909 A * 7/1959 Taylor .................... B60P 1/027
254/9 R
6,533,260 B1 * 3/2003 Mock ...................... A61G 7/08
254/133 R
(Continued)

FOREIGN PATENT DOCUMENTS

DE 3807796 A1 9/1988
DE 9414456 U1 10/1994
(Continued)

OTHER PUBLICATIONS

Open Road Outfitters, Demo of Rampage Power Lift for Motorcycles, Feb. 1, 2010, https://www.youtube.com/watch?v=pOBvasLWmIA (Year: 2010).*
(Continued)

*Primary Examiner* — Tyrone V Hall, Jr.
(74) *Attorney, Agent, or Firm* — Bond Schoeneck & King, PLLC; George McGuire (57) ABSTRACT

An automated guided vehicle for assembling a motor vehicle including a drivable base and a vehicle carrier coupled to the base and extending in a longitudinal direction, is configured and developed in terms of a flexible production using simple constructional means, in such a way that the vehicle carrier has actuatable receiving points for carrying the motor vehicle, the vehicle carrier can be moved along its longitudinal direction relative to the base by means of a guide device and can be tilted around an axis oriented orthogonally to the longitudinal direction, such that the at least partially assembled motor vehicle can drive off of the vehicle carrier
(Continued)

on its own wheels when receiving points are released from the motor vehicle.

8 Claims, 8 Drawing Sheets

(58) Field of Classification Search
CPC ............... B65G 2201/0294; B62D 65/18; B23Q 7/001; B23Q 7/005; B23Q 7/1436; B61D 3/04
USPC ..... 259/89 R, 90, 93 L, 10 R, 10 B; 254/134, 254/90, 93 L, 10 R, 10 B
See application file for complete search history.

(56) References Cited

U.S. PATENT DOCUMENTS

| | | | | |
|---|---|---|---|---|
| 8,157,079 | B2* | 4/2012 | Assmann | B62D 65/18 198/345.1 |
| 2012/0285797 | A1 | 11/2012 | Ooe | |
| 2015/0129820 | A1* | 5/2015 | Svihla | B66F 7/243 254/3 B |

FOREIGN PATENT DOCUMENTS

| | | | |
|---|---|---|---|
| DE | 19706345 A1 | 8/1998 | |
| DE | 29724417 U1 | 3/2001 | |
| DE | 102010048806 A1 | 4/2012 | |
| WO | WO-9626152 A1 * | 8/1996 | ............... B66F 7/22 |
| WO | 2009113268 A1 | 9/2009 | |

OTHER PUBLICATIONS

Lawnspecialties, disboards.com, Jan. 15, 2006, https://www.disboards.conn/threads/loading-a-golf-cart-in-the-back-of-a-truck.1693649/page-2.*

International Search Report and Written Opinion Form PCT/ISA/210 and PCT/ISA/237, International Application No. PCT/EP2016/068805, pp. 1-9, International Filing Date Aug. 5, 2016, mailing date of search report dated Nov. 7, 2016.

* cited by examiner

DRIVERLESS TRANSPORT DEVICE FOR ASSEMBLING A MOTOR VEHICLE AND METHOD FOR UNLOADING A MOTOR VEHICLE FROM A TRANSPORT VEHICLE OF THIS TYPE

CROSS-REFERENCE TO RELATED APPLICATIONS

This application is the United States National Phase Entry of PCT Application No. PCT/EP2016/068805, filed Aug. 5, 2016, which claims priority to German Application No. 10-2015-214980.3 (DE), filed Aug. 6, 2015, the entire disclosure of each of which is incorporated herein by reference.

1.0 BACKGROUND OF THE INVENTION

The present invention relates to a driverless transport device for assembling a motor vehicle comprising a drivable base and a vehicle carrier coupled to the base and extending in a longitudinal direction. The present invention also relates to a method for unloading a motor vehicle from a driverless transport device that functions to assemble a motor vehicle.

Transport devices for assembling a motor vehicle are known in the prior art. These are self-propelled movable assembly platforms that can carry a body of a motor vehicle for example and can transport said body to assembly stations.

Drivable assembly devices for vehicle units to be assembled are also known. For example, DE 10 2012 107 511 A1 discloses an assembly device comprising a carrier structure having a driving device, and a unit carrier for holding a unit, the unit carrier being raiseable. This allows a unit to be automatically transported and to be raised for assembly purposes.

A disadvantage of transport and assembly devices of this kind, however, is that additional handling means, for example lifting platforms or overhead conveyors, are required for handling the vehicles or vehicle components and in particular for unloading said vehicles or components. This limits the flexibility in production, since the movable transport devices have to approach fixed unloading stations. If there are not sufficient unloading stations available, a backlog results, which can impair production.

2.0 SUMMARY OF THE INVENTION

The object of the present invention is that of allowing flexible production using a transport device, by simple constructional means. The invention achieves the above object by means of the features of claim 1. According thereto, the transport device is characterized in that the vehicle carrier has actuatable receiving points for carrying the motor vehicle, in that the vehicle carrier can be moved along its longitudinal direction relative to the base by means of a guide device and can be tilted around an axis oriented orthogonally to the longitudinal direction, such that the at least partially assembled motor vehicle can drive off of the vehicle carrier on its own wheels when receiving points are released from the motor vehicle.

The transport device according to the invention makes it possible to increase flexibility in production. For example, the motor vehicle can be carried by the transport device and transported individually to specific production stations. Individual, for example partially assembled, motor vehicles can be removed from production and temporarily stored. The base of the transport device can be moved freely on the ground, for example the floor of a production facility. In addition, it is particularly advantageous that the motor vehicle can drive or roll off of the transport device on its own wheels without loading aids. In this respect, the transport device comprises an integrated (un)loading means. Loading aids for unloading, for example fixed unloading stations, are not required and do not need to be approached by the transport device either, which allows more flexible paths during production.

For unloading the motor vehicle, the vehicle carrier is moved in its longitudinal direction relative to the base and is tilted around an axis oriented orthogonally to the longitudinal direction. In addition, the actuatable receiving points of the vehicle carrier are released from the motor vehicle. The motor vehicle can drive off of the vehicle carrier on its own wheels. In this case, the motor vehicle can be unloaded not only onto the ground, but can also be transferred to a plane at a different height, for example a storage rack. Depending on the height of the other plane, for example the storage rack, this can also take place without tilting the vehicle carrier.

The driverless transport device is in particular an automated guided vehicle (AGV).

A drive, for example a chain drive or a rack and pinion drive, may be provided for moving the vehicle carrier relative to the base. A drive of this kind can act between the vehicle carrier and the base or between the vehicle carrier and a lift table associated with the base. When the drive acts between the vehicle carrier and the lift table, it is possible to move the vehicle carrier in its longitudinal direction, at least over part of the maximum movement path, even when the lift table is raised. A lifting cylinder that can be subjected to tensile and compressive loading may be provided for tilting the vehicle carrier. The lifting cylinder can be coupled both to the base and to the vehicle carrier.

The term "motor vehicle" includes vehicles, automobiles and commercial vehicles. Even if reference is made primarily to automobiles here, the described steps and the advantages thereof can also be achieved in commercial vehicles. The motor vehicle may also be a "rolling chassis" in which no motor is incorporated. An internal combustion engine or an electric motor can be used as the motor.

The vehicle carrier can advantageously be coupled to the base by means of a lift table that is adjustable in height relative to the base. In this way, the motor vehicle can be raised by the transport device such that work can also be carried out in lower portions of the vehicle or work can be carried out underneath the vehicle. It is possible to achieve ergonomic working positions for the mechanics working on the motor vehicle.

Further advantageously, the vehicle carrier can be coupled to, in particular guided on, the lift table by means of a lift table top. A stable connection of the vehicle carrier to the lift table can thus be achieved. The fact that the dimensions of the lift table top are smaller than those of the lift table is favorable for the movement range of the vehicle carrier relative to the base or to the lift table. It is further advantageous for the lift table top to be pivotable relative to the base or to the lift table, in particular around an axis oriented orthogonally to the lift table (lift table plane). The vehicle carrier, and therefore also the vehicle, can thus be pivoted relative to the base, and use can be made of this in order to make assembly positions accessible or to improve ergonomics during assembly. A rotary drive can be used for driving the pivoting action. For this purpose, a driving pinion of a drive motor can be fastened to the lift table, and a ring gear can be fastened to the rotary head. It is also conceivable for a movement of the vehicle carrier along its longitudinal direction to be blocked or at least restricted, when the lift table top is pivoted, for reasons of tilt resistance.

Within the context of a preferred embodiment, the lifting table can be configured such that it can be tilted relative to the base. In this way, too, work can be carried out in lower regions of the vehicle or underneath the vehicle. As a result, the ergonomics can be further optimized for mechanics working on the motor vehicle, by means of ergonomic working positions. It is conceivable for the lift table to be able to be pivoted or tilted around an axis that is in parallel with the longitudinal direction of the transport device or around an axis that is orthogonal to the longitudinal direction of the transport device. The lift table, and therefore the vehicle carrier, can thus be tilted to the sides or to the ends of the drivable base. In this case, the lift table can be tilted or pivoted by extending, by different amounts, lifting columns or lifting cylinders that form "table legs" of the lift table. In this case, the lifting columns/lifting cylinders can each be hingedly mounted on the table surface element ("tabletop"), for example on the "eye" of the lifting cylinder, by means of a pivot bearing. Alternatively or in addition, a pivoting device can be provided between the lift table and the lift table top. This allows an even greater tilt range for the vehicle carrier.

The vehicle carrier can expediently comprise at least one crossbar that extends transversely or obliquely to the longitudinal direction of said carrier and is displaceably guided in the longitudinal direction relative to the vehicle carrier, and wherein on said crossbar the receiving points, at least some of the receiving points, are arranged. Displacement of the crossbars allows the vehicle carrier to be adapted to different motor vehicles. For example, the crossbars can be displaced on the vehicle carrier such that said carrier carriers the motor vehicle at its jacking points. In addition, moving or displacing the at least one crossbar along the longitudinal direction of the vehicle carrier allows for active conveying of the motor vehicle, as a result of which a process of the motor vehicle driving off of the vehicle carrier can be assisted.

Specifically, the receiving points can be displaceably guided in the longitudinal direction of the crossbars in order to be able to adapt the receiving points to vehicles of different vehicle widths or having differently positioned jacking points. In addition, the receiving points can be adjustable in height relative to the crossbar in order to be able to receive or release the motor vehicle, in particular when the vehicle is standing on its own wheels. The receiving points can each comprise a lifting spindle for carrying out the height adjustment relative to the crossbar.

Advantageously, one end, in particular the tiltable end, of the vehicle carrier can comprise a tapering portion that functions as a drive-off ramp. The motor vehicle can thus drive off of the vehicle carrier without further aids.

The vehicle carrier can expediently comprise holders for components of the motor vehicle that are to be assembled. Units for the motor vehicle, for example a motor or a transmission, can thus be carried and installed in a vehicle. In a similar manner to the crossbars, the holders for the components to be assembled can also be displaceably guided in the longitudinal direction of the vehicle carrier. Moreover, the holders for the components to be assembled can be adjustable in height, for example by means of lifting spindles.

The vehicle carrier can expediently comprise a carriage that is movable in the longitudinal direction and comprises at least one wheel support, preferably two wheel supports, for moving the motor vehicle relative to the vehicle carrier. Unloading of the motor vehicle can be assisted thereby, since the movable carriage carries the motor vehicle by means of the wheel supports and guides the motor vehicle down from the vehicle carrier by means of movement in the longitudinal direction of said vehicle carrier. The wheel supports can be configured as a safety and/or drive-down wedge. The wheel supports can be adjusted in the longitudinal direction of the carriage, and thus adapted to vehicles of different axle widths.

It is furthermore conceivable for the carriage to be guided by means of carriage rails that are arranged on the vehicle carrier and oriented in the longitudinal direction of the vehicle carrier, and by means of carriage guides that are arranged on the carriage and that run on the carriage rails. A carriage drive, for example in the form of a chain drive, a rack-and-pinion drive or a spindle drive, may be provided for moving the carriage along the vehicle carrier. It is furthermore conceivable for the carriage to comprise a wedge portion at the end thereof oriented towards the tiltable end of the vehicle carrier, in order to transfer the vehicle from the load receiving points on the crossbar to the carriage.

Specifically, the guide device can comprise a profile rail arranged on the vehicle carrier, and a recess that is arranged in the base and is intended for guiding the profile rail. The vehicle carrier is thus guided in the longitudinal direction when it is resting on the base, that is to say in particular when the lift table is lowered. In this case, the recess may have a constant width or, in other words, be "open" at the top, such that the vehicle carrier is guided in the lateral direction but is displaced in the longitudinal direction of the recess and can thus also be tilted relative to the base. The recess may be formed as a longitudinal slot. This achieves reliable guidance of the vehicle carrier on the base when tilted.

The guide device expediently comprises a seat that is arranged in the lift table, in particular on the lift table top, wherein said seat is complementary to the profile rail, and allows only a longitudinal displacement of the profile rail. In other words, "engagement" between the profile rail and the complementary seat results, such that only a longitudinal displacement is possible between the lift table, in particular the lift table top, and the vehicle carrier. In particular, the vehicle carrier is prevented from tilting in its longitudinal and/or transverse direction.

In order to facilitate tilting of the vehicle carrier relative to the base, it is advantageous for the vehicle carrier not to comprise a profile rail over its entire movement length. The vehicle carrier can thus be uncoupled from the lift table, in particular from the lift table top, specifically by means of the profile rail and the seat disengaging. The vehicle carrier can thus easily be tilted relative to the base and guided by means of recesses formed in the base for example. As already mentioned, the vehicle carrier can be tilted using a lifting cylinder.

Advantageously, at least two sides of the base, preferably the periphery of the base, can comprise a platform for workers, tools and/or components to be assembled. This promotes flexibility in production, because not only can the motor vehicle be moved to the specified assembly stations by means of the transport device, but assembly work can also be carried out during travel of the transport device.

The base can expediently comprise at least two wheel axles that each comprise two individually, in particular wheel-specifically, drivable wheels and/or an energy store for supplying power. The wheel axles can be arranged in two drive portions of the base, for example as single-pivot wheel axles. These drive portions can each be encased by a housing.

A connecting portion of the base, in which the lift table can be arranged, can extend between the drive portions. The transport device can be moved freely, i.e. also laterally, obliquely or transversely, on the ground by means of the wheel axles. The energy store can be configured as an accumulator or battery and can supply the transport device with power in an off-grid power supply (i.e. energy network independent) manner.

The object mentioned at the outset is also achieved by a method for unloading a motor vehicle, having the features of the coordinated claim. In order to avoid repetitions, with regard to the advantages achievable by this method reference is made to what has been said in this regard with reference to the transport device according to the invention.

The feature, contained in the coordinated claim, of tilting the vehicle carrier is optional. Tilting of the vehicle carrier is necessary, for example, if the motor vehicle is to be unloaded for example on a plane (level) located below the vehicle carrier, in particular the ground. If the motor vehicle is to be transferred or loaded not onto the ground but instead onto a plane that is different from the ground and is at a different height within the lifting range of the lift table, it is not necessary to tilt the vehicle carrier. The vehicle carrier can then be aligned substantially horizontally.

The measures described within the context of the transport device, which measures can also be interpreted in view of the method, can be used to develop the method for unloading a motor vehicle.

BRIEF DESCRIPTION OF THE DRAWINGS

Figure 1:
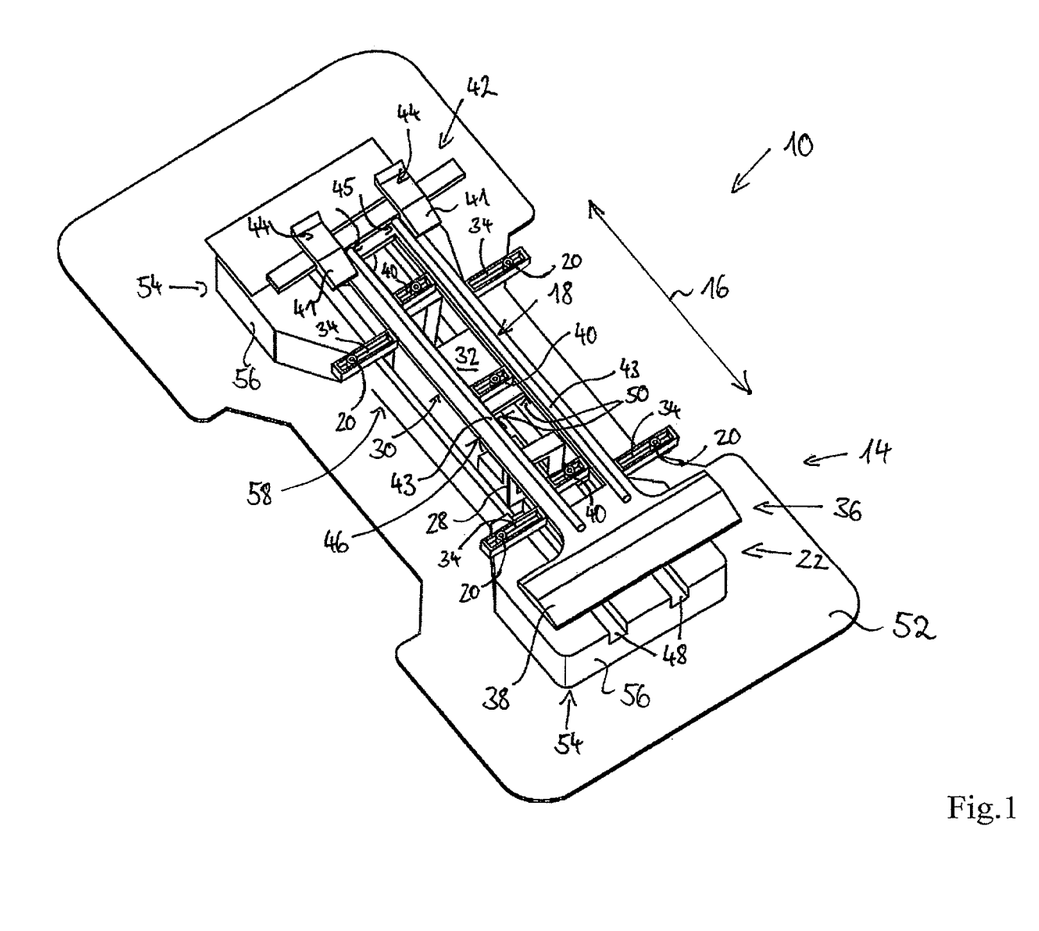
FIG. 1 is a schematic view of an embodiment of a driverless transport device.
Figure 2:
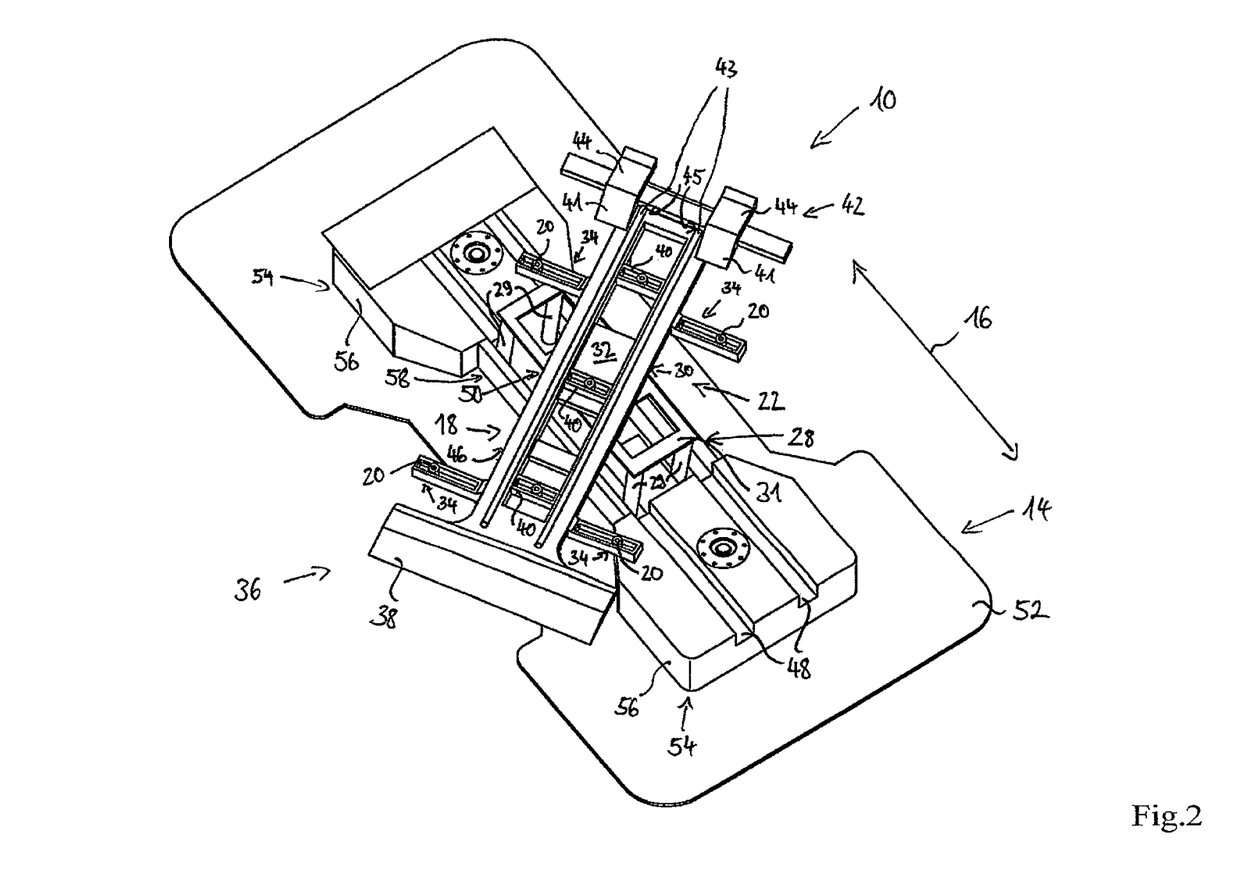
FIG. 2 shows the driverless transport device from FIG. 1 when the vehicle carrier is pivoted.
Figure 4A:
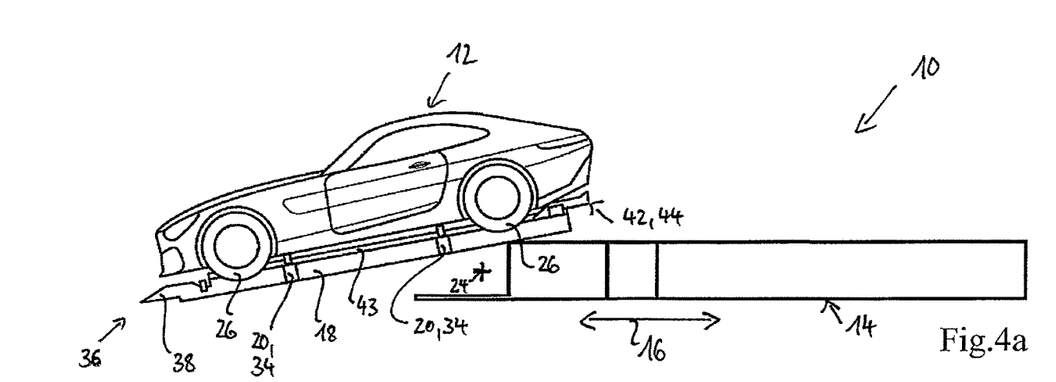
FIG. 4a, b are schematic side views of a first and a second step of unloading the motor vehicle from the transport device.
Figure 4B:
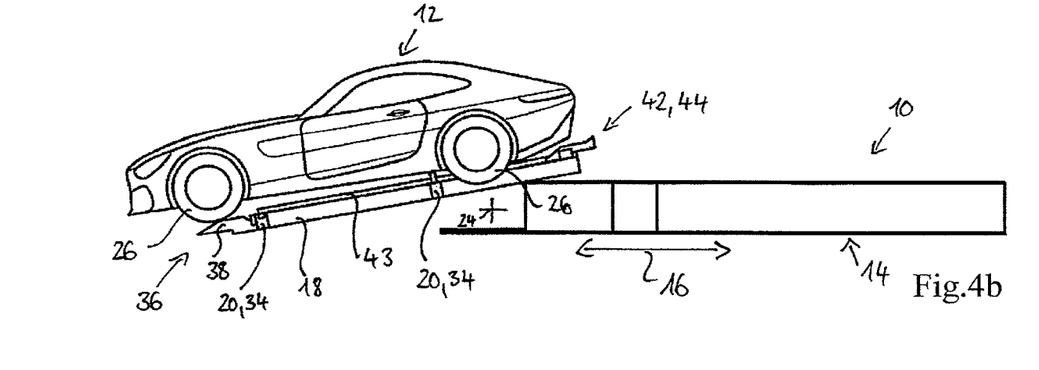
Figure 5A:
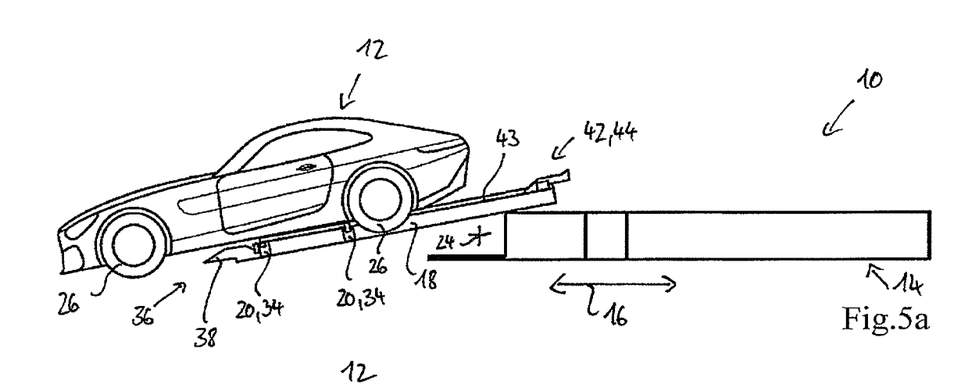
FIG. 5a, b are schematic side views of a third and a fourth step of unloading the motor vehicle from the transport device.
Figure 5B:
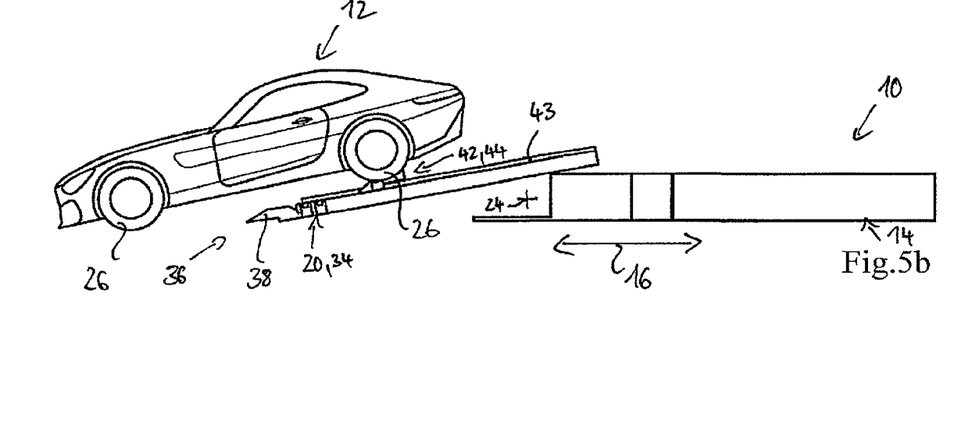
Figure 6A:
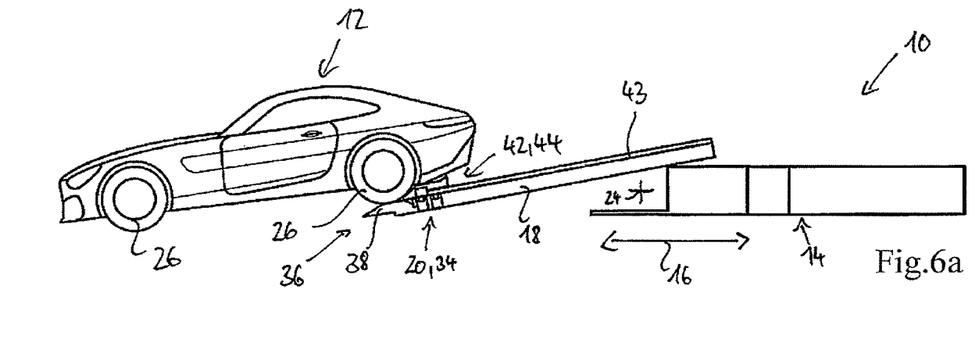
FIG. 6a, b are schematic side views of a fifth and sixth step of unloading the motor vehicle from the transport device.
Figure 6B:
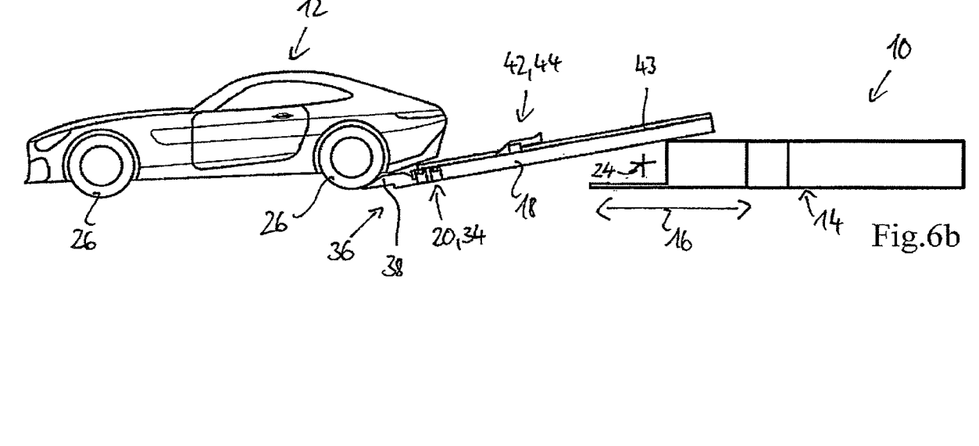

The invention will be explained in greater detail in the following with reference to the figures, in which:

FIG. 1 shows an embodiment of a driverless transport device 10 for assembling a motor vehicle 12 (see FIGS. 4 to 6).

DETAILED DESCRIPTION

The transport device 10 comprises a drivable base 14 and a vehicle carrier 18 coupled to the base 14 and extending in a longitudinal direction 16.

The vehicle carrier 18 further comprises actuatable receiving points 20 for carrying the motor vehicle 12. The vehicle carrier 18 can be moved along its longitudinal direction 16 relative to the base 14 by means of a guide device 22 and can be tilted around an axis 24 oriented orthogonally to the longitudinal direction 16. The at least partially assembled motor vehicle 12 can thus drive off of the vehicle carrier 18 on its own wheels 26 when receiving points 20 are released from the motor vehicle 12 (cf. FIGS. 4 to 6).

The vehicle carrier 18 is coupled to the base 14 by means of a lift table 28 that is adjustable in height relative to the base 14. The vehicle carrier 18 is guided on the lift table 28 by means of a lift table top 32 that can be pivoted relative to the base 14 by means of a rotary drive 30.

Figure 7:
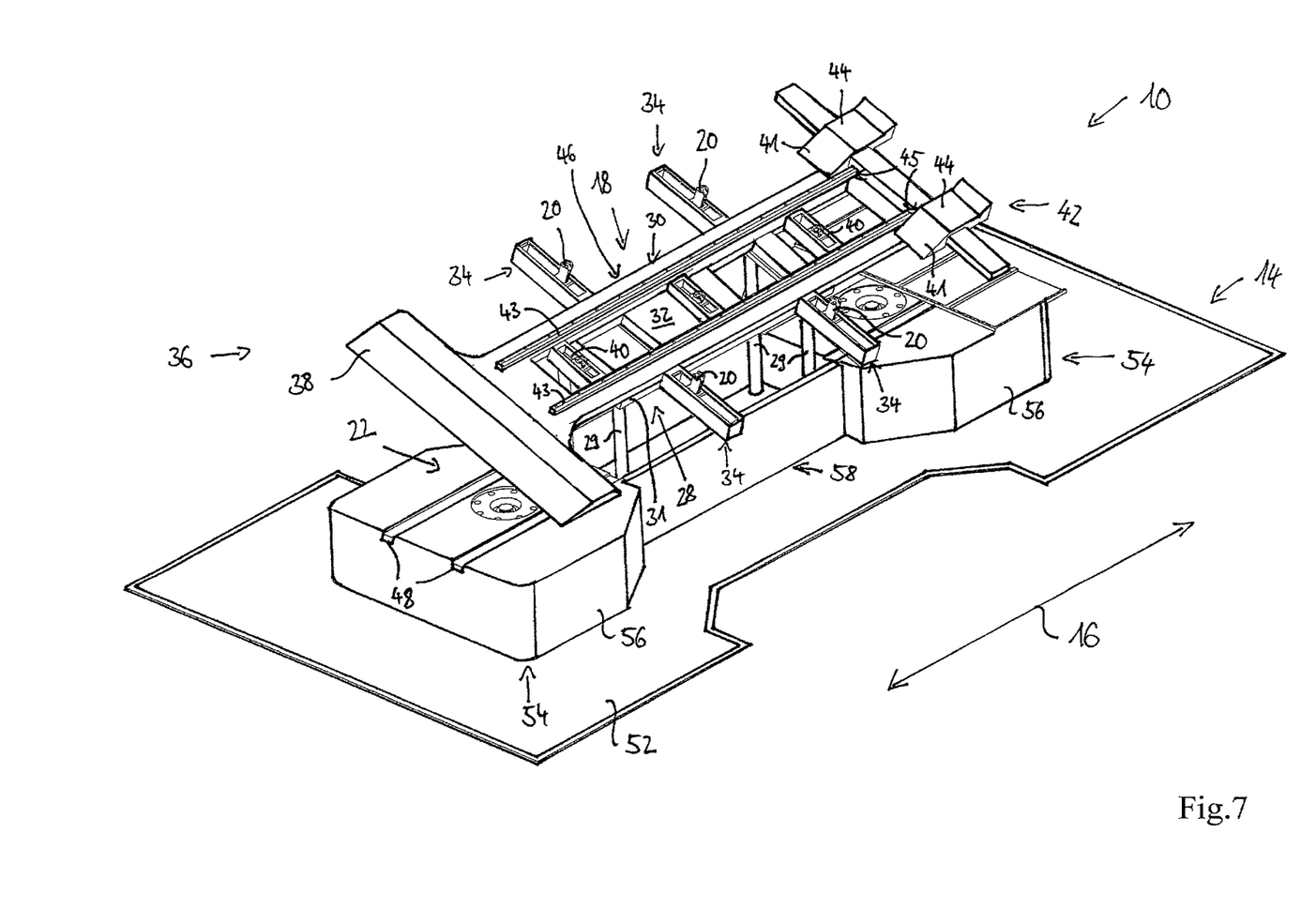
FIG. 7 is a schematic perspective view of the driverless transport device from FIG. 1 having a tilted lift table.
Figure 8:
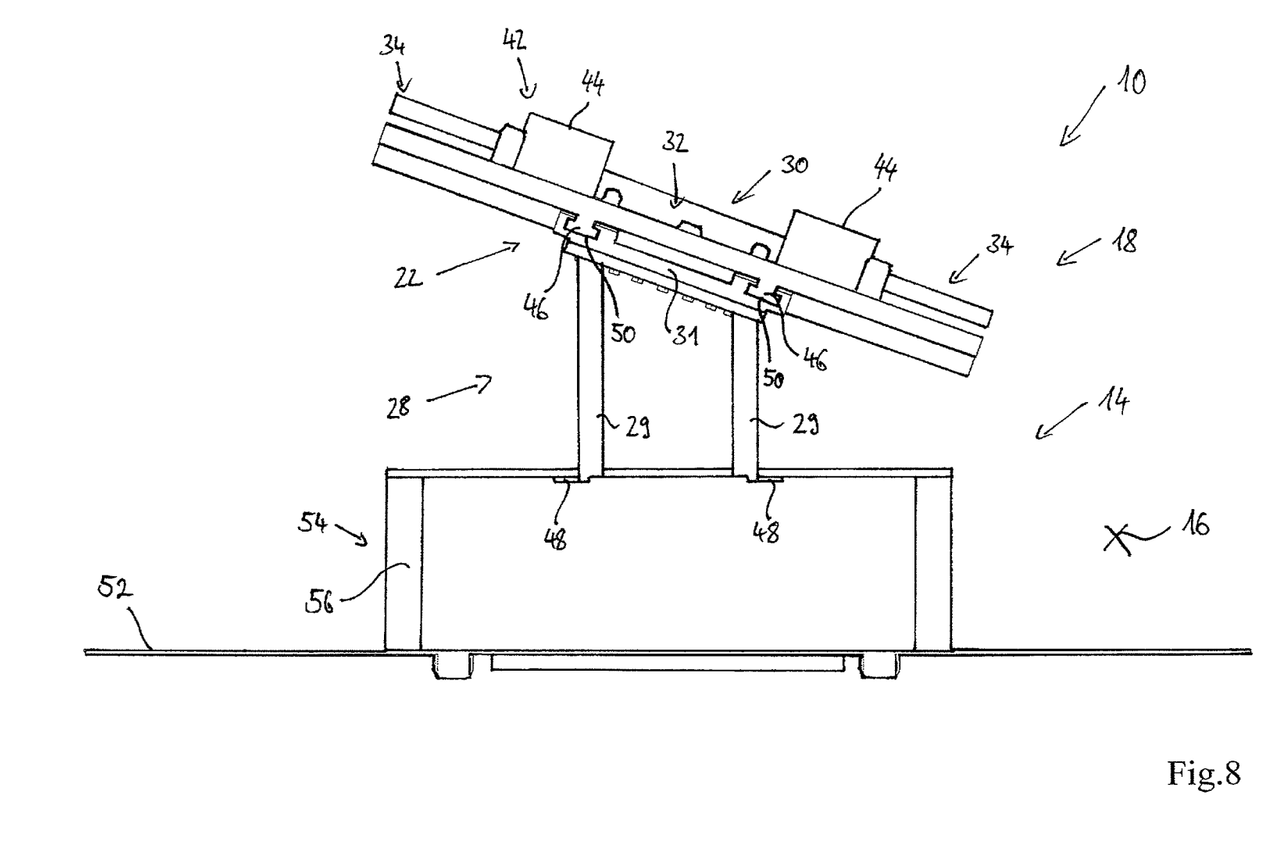
FIG. 8 is a schematic front view of the driverless transport device in the state shown in FIG. 7.

The lift table 28 is configured so as to be tiltable relative to the base 14. In this case, the lift table 28 can be pivoted or tilted around an axis that is in parallel with the longitudinal direction 16. The lift table 28, and therefore the vehicle carrier, can thus be tilted towards the sides of the drivable base 14 (see FIGS. 7 and 8). In this case, the lift table is tilted or pivoted by extending, by different amounts, lifting columns or lifting cylinders 29 that form "table legs" of the lift table 28. The lifting columns or lifting cylinders 29 are each hingedly mounted on the table surface element 31 by means of a pivot bearing.

The vehicle carrier 18 comprises two crossbars 34 that extend transversely to the longitudinal direction 16 and are displaceably guided in the longitudinal direction 16 relative to the vehicle carrier 18 (see FIG. 1). The receiving points 20 are arranged on the crossbars 34. The receiving points 20 are actuatable and can be released from the motor vehicle 12. The receiving points 20 can comprise lifting spindles for example.

A displacement of the crossbar 34 along the longitudinal direction 16 of the vehicle carrier 18 allows for active conveying of the motor vehicle 12, which assists unloading of the motor vehicle 12 from the vehicle carrier 18.

One end, in particular the tiltable end 36, of the vehicle carrier 18 comprises a tapering portion 38 that functions as a drive-off ramp. The motor vehicle 12 can thus drive off of the vehicle carrier 18 (cf. FIGS. 4 to 6).

The vehicle carrier 18 comprises holders 40 for the components of the motor vehicle 12 that are to be assembled. Just like the crossbars 34, the holders 40 can be displaceably guided on the vehicle carrier 18. The holders 40, and also the crossbars 34, can thus be adjusted to different motor vehicles 12.

The vehicle carrier 18 comprises a carriage 42 that is movable in the longitudinal direction 16 and comprises two wheel supports 44. The wheel supports 44 can be configured as a safety/drive-down wedge and can be adjusted or displaced in the longitudinal direction of the carriage 42. The carriage 42 functions to move the motor vehicle 12 relative to the vehicle carrier 18. The wheel supports 44 can comprise a wedge portion 41 via which the motor vehicle 12 can drive off of the wheel supports 44. The carriage 42 is displaceably guided by means of carriage rails 43 that are arranged on the vehicle carrier 18 and carriage guides 45 that are arranged on the carriage 42.

Figure 3A:
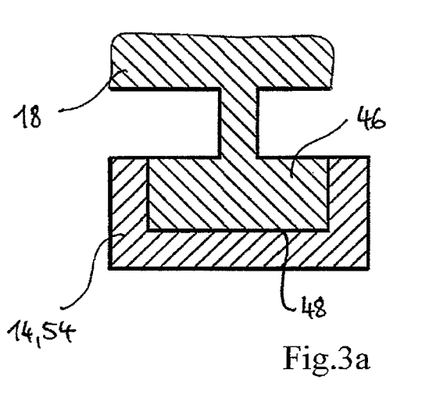
FIG. 3a, b are a plurality of partial views (cross sections A-A and B-B along the axes in FIG. 1) of the profile rail of the vehicle carrier in a recess and a seat.

The guide device 22 comprises two profile rails 46 arranged on the vehicle carrier 18, and two recesses 48 arranged in the base 14 for guiding one of the profile rails 46 in each case (cf. FIG. 3a). In this way, the vehicle carrier 18 can be displaced in the longitudinal direction relative to the base 14 and can be tilted relative to the base 14, since the recess 48 has a constant width or is "open at the top".

Figure 3B:
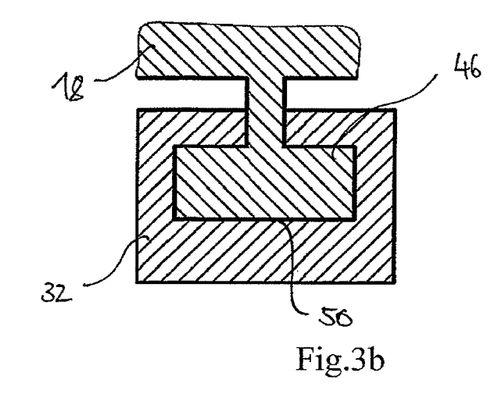

The guide device 22 additionally comprises a seat 50 that is arranged in the lift table 28, in particular on the lift table top 32, wherein the seat 50 is complementary to the profile rail 46, and allows only a longitudinal displacement of the profile rail 46. Engagement between the profile rail 46 and the seat 50 results in the process.

In view of tilting the vehicle carrier 18 using simple constructional means, it is advantageous for the profile rail 46 not to extend over the entire movement length of the vehicle carrier 18, but instead in a central region of the vehicle carrier 18, viewed in the longitudinal direction 16, for example in the central 40 to 60 percent of the movement length of the vehicle carrier 18.

The base 14 comprises a peripheral platform 52 for workers, tools and/or components to be assembled. It is thus possible for assembly work to be carried out on the motor vehicle 12 even when the transport device 10 is being moved.

The drivable base 14 comprises two wheel axles that each comprise two individually, in particular wheel-specifically, drivable wheels and/or an energy store for supplying power (each without reference signs). The wheel axles are arranged in drive portions 54 that are encased by housing portions 56.

A connecting portion 58 of the base 14 extends between the drive portions 54. The lift table 28 is arranged in the connecting portion 58.

The method for unloading a motor vehicle 12 from a driverless transport device 10 that functions to assemble a motor vehicle 12 is carried out in the following manner (cf. FIGS. 4 to 6):

Firstly, a vehicle carrier 18 that extends in a longitudinal direction and carries the motor vehicle 12 by means of receiving points 20 is moved along its longitudinal direction 16 relative to a drivable base 14 (this has already taken place in FIG. 4a).

The vehicle carrier 18 is then tilted around an axis 24 extending orthogonally to the longitudinal direction 16 (this has likewise already taken place in FIG. 4a).

Subsequently, the receiving points 20 are released from the motor vehicle 12 (cf. FIGS. 4a to 5b).

Finally, the at least partially assembled motor vehicle 12 is driven off on its own wheels 26 (cf. FIG. 4b to FIG. 6b).

A vehicle can thus be easily unloaded from a transport device 10 that functions to assemble the motor vehicle 12, for example onto the ground, or loaded onto another plane, for example onto or into a storage device.

The unloading steps shown in FIGS. 4 to 6 will be clarified in the following:

In FIG. 4a, the vehicle carrier has been uncoupled from the lift table 28, moved to the front end position, and already tilted or hinged around the axis 24 extending transversely to the longitudinal direction 16.

The crossbars 34 then move forwards, in particular synchronously, until the wheels 26 of a first axle of the motor vehicle 12, in particular the front wheels 26 of a front axle of the motor vehicle 12, make contact with the ramp portion 38 of the vehicle carrier 18 and, as a result, the wheel suspension on the first axle, in particular the front axle, of the vehicle deflects. The lifting spindles of the receiving points 20 of the front crossbars 34 are retracted. The motor vehicle 12 is thus already resting on its wheels 26 on a first axle, in particular the front axle (cf. FIG. 4b).

Subsequently, the rear crossbars 34 are moved forwards so that the first axle, in particular the front axle, of the vehicle 12 rolls on the floor (cf. FIG. 5a).

After that, the carriage 42, together with the wheel supports 44 or drive-down wedges 44, is moved towards the tiltable end 36. The wedge portions of the wheel supports 44 are pushed under the wheels 26 of a second axle, in particular the rear axle, of the motor vehicle 12, as a result of which the wheel suspension on the second axle, in particular the rear axle, deflects and the motor vehicle 12 is uncoupled from the rear crossbars 34. The rear crossbar 34 moves into the front end position (cf. FIG. 5b).

Subsequently, the carriage 42 moves into the front end position, until the wheel supports 44 are positioned directly above the ramp portion of the wheel supports 44. The second axle, in particular the rear axle, of the motor vehicle 12 can then roll over the ramp portion 38. The motor vehicle 12 is thus unloaded from the transport device 10 and from the vehicle carrier 18 (cf. FIGS. 6a and 6b).

Even though, in the present embodiment, the front of the motor vehicle 12 is oriented towards the tiltable end 36 of the vehicle carrier 18, a reversed arrangement of the motor vehicle 12 such that its tail is at the tiltable end 36 of the vehicle carrier 18 is also conceivable. In this case, the motor vehicle 12 would drive off of the vehicle carrier 18 backwards, beginning with its tail.

What is claimed is:

1. A driverless transport device for assembling an automobile, comprising a drivable base and a vehicle carrier coupled to the base and extending in a longitudinal direction, characterized in that the vehicle carrier has actuatable receiving points for carrying the automobile, in that the vehicle carrier is movable along its longitudinal direction relative to the base via a guide device and can be tilted around an axis oriented orthogonally to the longitudinal direction and comprises two wheel supports for moving the automobile relative to the vehicle carrier, such that the at least partially assembled automobile can drive off of the vehicle carrier on its own wheels when the receiving points are released from the automobile, wherein the driverless transport device is configured as a an automated guided vehicle, wherein the vehicle carrier further comprises at least one crossbar that extends transversely or obliquely to the longitudinal direction of said vehicle carrier and is displaceably guided in the longitudinal direction relative to the vehicle carrier, and wherein on said crossbar the receiving points are arranged.

2. The driverless transport device according to claim 1, characterized in that the vehicle carrier is coupled to the base by a lift table that is adjustable in height relative to the base.

3. The driverless transport device according to claim 2, characterized in that the guide device further comprises a seat that is arranged in the lift table, wherein said seat is complementary to a profile rail, and allows only a longitudinal displacement of the profile rail.

4. The driverless transport device according to claim 2, characterized in that the lift table is configured so as to be tiltable relative to the base.

5. The driverless transport device according to claim 1, characterized in that one end of the vehicle carrier further comprises a tapering portion that functions as a drive-off ramp.

6. The driverless transport device according to claim 1, characterized in that the guide device further comprises a profile rail arranged on the vehicle carrier, and a recess that is arranged in the base and is intended for guiding the profile rail.

7. The driverless transport device according to claim 1, characterized in that at least two sides of the base further comprise a platform for at least one of workers, tools and components to be assembled.

8. Method for unloading an automobile from an automated guided vehicle that functions to assemble an automobile, the method comprising the steps of:

moving a vehicle carrier, extending in a longitudinal direction and carrying the automobile by actuating receiving points, along its longitudinal direction relative to a drivable base, providing at least one crossbar that extends transversely or obliquely to the longitudinal direction of said vehicle carrier and is displaceably guided in the longitudinal direction relative to the vehicle carrier, and wherein on said crossbar the receiving points are arranged, tilting the vehicle carrier around an axis extending orthogonally to the longitudinal direction, releasing the receiving points from the automobile, and driving the at least partially assembled automobile off on its own wheels.

\* \* \* \* \*